United States Patent Office 2,918,273
Patented Dec. 22, 1959

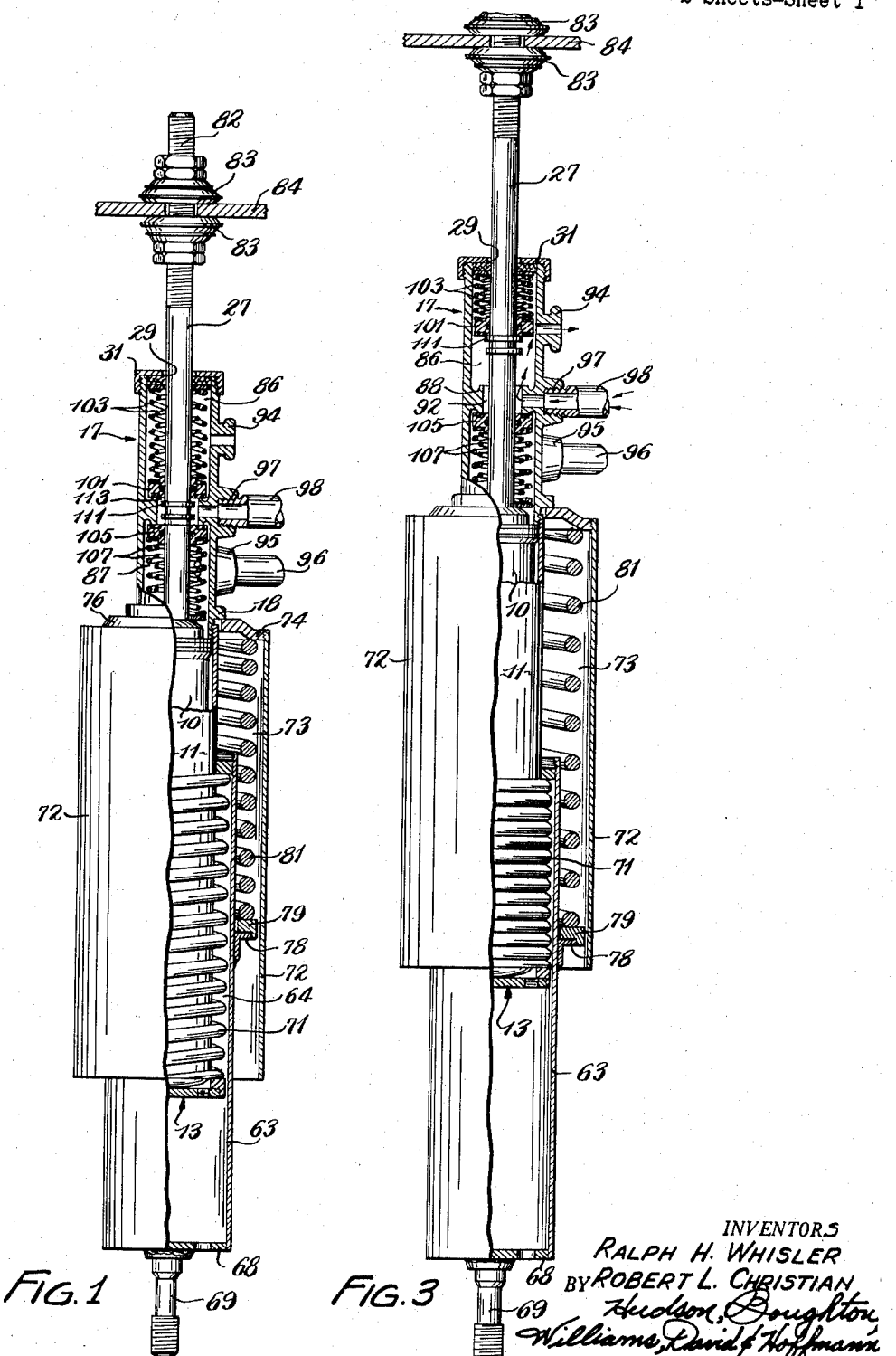

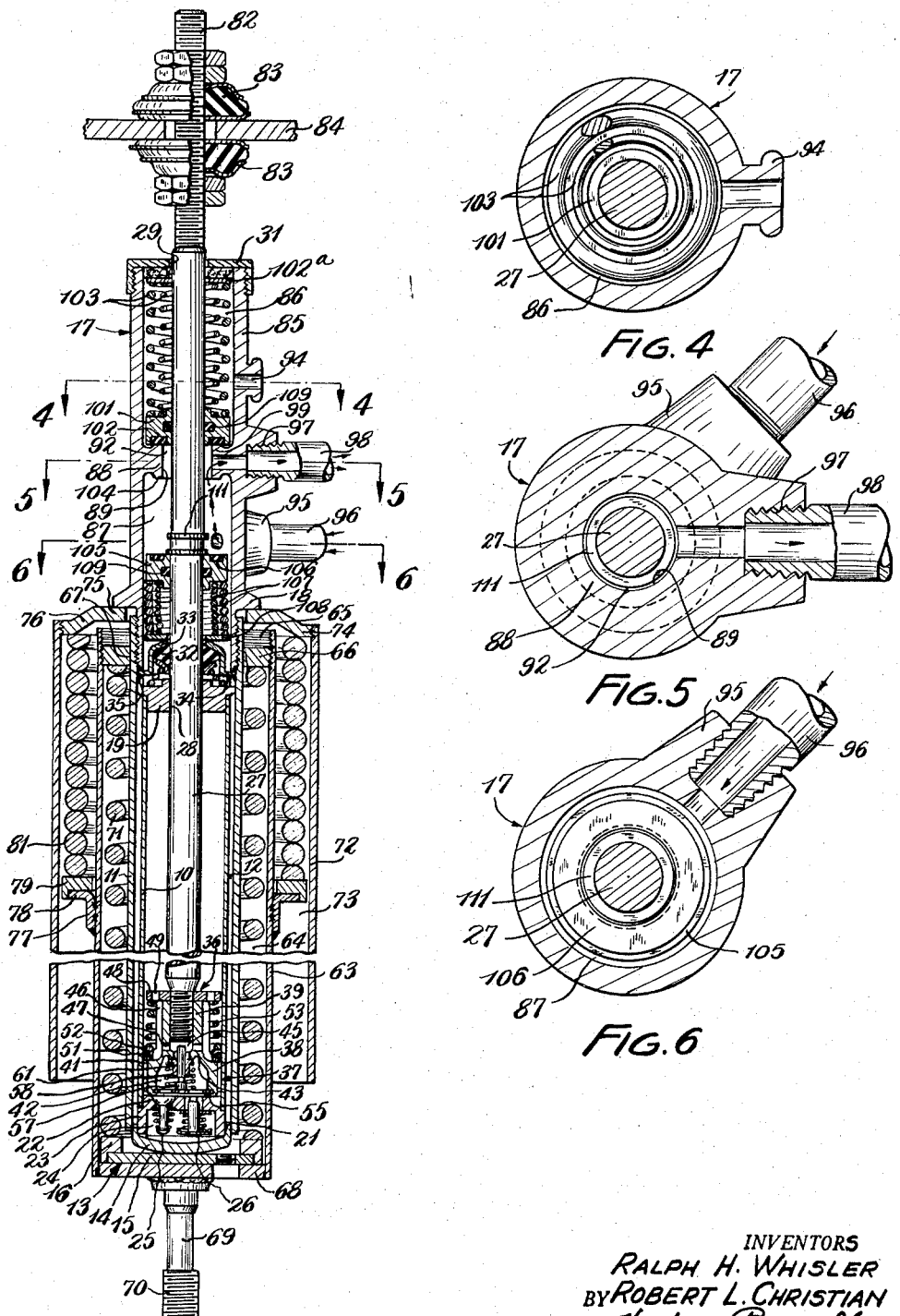

2,918,273

DAMPED AIR VALVE

Ralph H. Whisler, Euclid, and Robert L. Christian, Chardon, Ohio, assignors to The Gabriel Company, Cleveland, Ohio, a corporation of Ohio Application February 13, 1957, Serial No. 640,033

7 Claims. (Cl. 267—34)

This invention relates to a control device for an air spring which is interposed between two movable members, and more particularly to a control device which is operable in response to a relative movement between said movable members to cause adjustment of the air spring.

The control device of the present invention finds primary utility for use with an air spring for automotive vehicles of the like whereby said spring resiliently supports the vehicle body above the riding axles in a "safe-riding" spaced relationship. When the vehicle members are moved toward each other, such as occurs when the load carried by the body is increased, said movement causes the control device to operate and inflate the air spring and thereby return said vehicle members to their normal "safe-riding" spaced relationship. In like manner, when the vehicle members are moved away from each other, for instance by lessening the load carried by the vehicle body whereby the air spring raises said body upward, said movement causes operation of the control device of the present invention to deflate said air spring proportionately to return said vehicle members to their aforesaid relationship.

The control device of the present invention is also provided with a delay and damping mechanism which causes the impacts or forces applied to said control device to be ineffective to cause adjustment of the air spring unless the same are sustained over a time longer than said delay period. Also the control device of the present invention is operative to differentiate between impacts applied to the vehicle members, whereby those below a predetermined functioning period are ineffective to cause relative movement between the elements of the control device.

Therefore, the primary object of the present invention is the provision of a control device for an air spring utilized with automotive vehicles or the like for resiliently supporting the vehicle body above the riding axles, and wherein said control device is operable to sense a relative movement between the vehicle members to cause actuation of control means and effect adjustment of the air spring in proportion to said relative movement.

Another object is the provision of a control device as characterized in the preceding object and which includes a piston rod and casing which are relatively reciprocated by the relative movement of the vehicle members to selectively actuate valve means which connects the air spring to a source of fluid pressure to inflate the same, or to the atmosphere whereby said air spring is deflated, said actuation being responsive to a decrease or an increase in the relative spacing between said vehicle members respectively.

Still another object of the present invention is the provision of a control device for an air spring that is effective to cause adjustment in the air spring only in response to forces applied to the vehicle members that are above a predetermined functioning period.

Another object of the present invention is to provide a control device for an air spring which has a delay period incorporated therein and which prevents adjustment of the air spring unless the force applied to the vehicle members is sustained for a longer time than the duration of said delay period.

Still another object of the present invention is the provision of a control device for an air spring as characterized in the preceding objects and wherein double-acting resilient means are effective to initiate relative movement between the piston rod and casing when the force applied to the vehicle members is sustained over a predetermined period of time.

Additional objects and advantages of the control device of the present invention will be realized by those versed in the art by reference to the following description of a preferred embodiment and illustrated in the accompanying drawings forming a part thereof, and wherein:

Fig. 1 is an elevational view, shown partly in longitudinal section, of a control device embodying the present invention;

Fig. 2 is a longitudinal sectional view on a larger sacle of the control device of Fig. 1, with certain of the parts in a different operative position than in Fig. 1;

Fig. 3 is a view similar to Fig. 1 but shows the parts thereof in still a different position;

Fig. 4 is a sectional view taken substantially on line 4—4 of Fig. 2 looking in the direction of the arrows;

Fig. 5 is a sectional view taken substantially on line 5—5 of Fig. 2; and,

Fig. 6 is a sectional view taken substantially on line 6—6 of Fig. 2.

Merely for purposes of illustration, the control device of the present invention incorporates therein components of a direct double-acting tubular fluid shock absorber. However, it is clearly understood that the utilization of said components is not intended to define a limitation for the use of the control device; it being ascertainable that various other forms of pressure fluid devices may be utilized. The present form of shock absorber utilized is of the general type but not exactly similar to that described and claimed in Patent No. 2,729,308 issued on January 3, 1956 to Jerry V. Koski and Robert E. Schwary. This type of shock absorber device comprises a pressure or working cylinder 10 arranged concentrically within but spaced radially inwardly of a cylindrical casing 11. The annular space between the cylinder and casing constitutes a reservoir 12 for the fluid medium. The lower end of the casing 11, as viewed in Fig. 2, is closed by a closure member 13 into which seats the lower end of the working cylinder 10 and comprises an upper cup-shaped portion 14 partially interfitting the end of the casing and suitably secured thereto, and an integrally connected substantially flat circular plate 15 provided on its periphery with an annular flange, or shoulder 16. A valve housing 17, later to be described, has its lower end threadably mounted within the upper end of the casing 11 and has an annular flange 18 extending outwardly therefrom adjacent its lower threaded end. The upper end of the pressure cylinder 10 is closed by a plug 19 which has portions bearing against the sides of the casing 11 and which is engaged by the portion of the valve housing extending therewithin. The lower end of the pressure cylinder 10 is closed by a valve mechanism 21 comprising a valve plate 22 partially interfitting said lower end and provided with a downwardly extending annular wall 23 arranged to seat upon the upper cup-shaped portion 14 of the closure member 13 and defining a chamber 24 therebetween. The valve plate 22 is provided with a pair of spaced ports communicating with the pressure cylinder 10 and chamber 24 and containing a replenishing valve 25 in one of said ports and an impact or compression valve 26 in the other of said ports. The replenishing valve and impact valve may be of any desired construction and for purposes of illustration are shown to be somewhat similar to the configuration as is illustrated in Patent 2,518,553 issued on August 15, 1950 to William H. Kieber.

A piston rod 27 extends into the pressure cylinder 10 and is slidable in a central opening 28 in the plug 19 in the upper end of the cylinder and also in a similarly disposed opening 29 in the cap or head 31 of the valve housing 17. A sealing gasket 32 mounted on the plug 19 surrounds the piston rod 27 and prevents the leakage of fluid from the valve housing 17. A cap 33 placed over the gasket 32 retains the latter in its operative position and has an annular flange 34 extending outwardly therefrom and embraced on opposite surfaces by opposed O-rings 35. Said O-rings extend in-between the adjoining spaced lower end of the valve housing 17 and the annular edge of the plug 19 being secured thereby in their operative positions to prevent the passage of fluid between the reservoir 12 and the valve housing.

A piston assembly 36 is mounted on the lower end of the piston rod 27 and may partake of various forms as is known in the art. Merely for purposes of illustration, the piston assembly 36 in the present instance comprises a cylindrical piston 37 consisting of a lower and enlarged portion 38 and an upper portion 39 being somewhat diametrically smaller than said lower portion 38. The periphery of the lower portion is provided with a plurality of circularly spaced and axially extending grooves or passages 41. A counterbore 42 is formed centrally through the lower portion, the upper end of which terminates vertically downwardly spaced from the upper portion 39 of said piston to define a wall 43, in the center of which is a port which communicates with the counterbore 42 and a central bore 45 in the upper portion 39, a portion of which is threaded to receive the piston rod 27. The upper portion 39 is also provided on its periphery with a plurality of circularly-spaced vertically extending grooves 46, and a plurality of radially spaced ports 47 formed in said latter portion places the centrally disposed bore 45 in comunication with said grooves 46. A spring retaining plate 48 mounted over the piston rod 27 engages the top surface of the upper portion 39 of said piston 37, and is provided with a plurality of circularly spaced ports 49 which connect with the grooves 46. An O-ring 51 carried centrally within a ring-shaped carrier plate 52 is slidably mounted over the upper reduced portion 39 and is in pressure engagement with the top surface of the lower enlarged piston portion 38 by means of a coil spring 53 interposed between said plate 48 and ring-shaped plate 52. In the position shown in Fig. 2, said carrier plate 52 is effective to close the upper end of the passages 41 and place the same out of comunication with the vertically extending grooves 46 in said upper reduced portion 39.

A disk 55 provided with a plurality of ports is rigidly secured to the lower end of the piston 37 extending completely across the counterbore 42, and has mounted thereon a stud 57 which projects upwardly therefrom and into the port formed in the wall 43. A recoil valve 58 is slidably mounted over the stud 57 and is in pressure engagement with a valve seat surrounding the port in the wall 43 by means of coil spring 61 interposed between the head of said valve and the disk 55.

With the above construction in mind, it will now be realized that on the impact or downward stroke of the piston 37 within the working cylinder 10, the pressure in said cylinder below the piston is increased, and when it reaches a predetermined magnitude it overcomes the force of spring 53 and moves the carrier plate 52 upwardly whereby the hydraulic fluid may flow from the lower side of the piston through the grooves 46 and to the upper side thereof. Also if sufficient pressure exists, the continued downward stroke of the piston will cause the opening of the impact valve 26 whereby a portion of said fluid is displaced by the moving piston rod and flows past said impact valve, into and through chamber 24 and thence into the reservoir 12. The oil flowing into the reservoir 12 produces a compression of the air therein above the oil level whereby a gradually increasing pneumatic pressure head is established at the upper end of the reservoir, which supplements the diminishing hydraulic resistance below the piston to retard the movement of said piston as is well understood in the art. It will also be realized that on the recoil or upward stroke of the piston 37 the pressure increases in the upper portion of the working cylinder and when it is of sufficient magnitude the recoil valve 58 is opened and hydraulic fluid may then flow into and through the ports 49 of the spring retainer plate 48. Said fluid is then enabled to flow through the peripheral grooves 46 in the upper piston portion 39, thence through the radially spaced ports 47 and into the central bore 45 and past said recoil valve 58 and into the counterbore 42 to the lower side of the piston. Also, during the recoil stroke the replenishing valve 25 is opened whereby the hydraulic fluid will flow from the reservoir 12 into the chamber 24 and thence past said replenishing valve 25 and into the counterbore 42 to the lower end of the working cylinder to maintain said cylinder substantially full of the hydraulic fluid as is well understood in the art.

As previously mentioned, the control device of the present invention is operable to cause impacts applied thereto that are below a predetermined functioning period, such as result from the vehicle traveling over an uneven roadway, ineffective to adjust the air spring of the fluid suspension system.

This is accomplished by means comprising an elongated cylindrical spring housing 63 surrounding the casing 11 being radially outwardly spaced therefrom to define a spring chamber 64. The upper end of the housing 63 is threaded at 65 and receives an externally threaded disk 66 which, in turn, is provided centrally thereof with an opening 67 through which the casing 11 slidably reciprocates. The lower end of the housing 63 is closed by a closure plate 68 which interfits said lower end and is suitably rigidly secured therein. An arm 69 provided centrally on said plate extends outwardly thereof and is threaded on its end at 70 and is adapted to be connected to one of the vehicle members, the body or the riding axles. An elongated helical spring 71 is disposed in the spring chamber 64 with its opposite ends engaging the disk 66 and the flange 16 of the closure member 13 and normally acts to force casing 11 against the bottom closure plate 68 of the spring housing 63 as cup-shaped portion 14 is rigidly secured to plate 15. A cylindrical skirt or guard 72 surrounding the spring housing 63 in radially outwardly spaced relationship defining an annular opening 73 therebetween, is provided on its upper end with a cap member 74. Said cap member is formed with an inner annular hub 75 that is spaced above the outer portion thereof by means of an integrally connected inclined wall 76. The annular hub 75 extends radially inwardly toward the casing 11 and engages the underside of the flange 18 on the valve housing 17. A ring member 77 is rigidly attached to the outside surface of the spring housing 63 substantially intermediate its ends and is integrally provided with an annular horizontal, radially outwardly extending rim portion 78 that mounts an annular inverted L shaped plate 79. As shown in Fig. 2, the annular plate 79 extends radially through the annular opening 73 being slightly spaced from the cylindrical skirt 72 to prevent binding therebetween and also to allow air entrapped therein to be freely exhausted. An elongated helical spring 81 is placed in the annular opening 73 surrounding said spring housing 63 and has its ends in engagement with the underside of the cap member 74 and the top of the annular plate 79. Said spring normally acts to press the annular hub 75 against the flange 18, and additionally tends to force the spring housing 63 and cylindrical guard 72 apart. However, the resultant reaction of the helical springs 71 and 81 normally moves the spring housing 63 to a position relative to the skirt 72, as is shown in Fig. 1, whereby the casing 11 is positioned upwardly within the spring chamber 64 and spaced above the circular plate 68 defining the lower closed end of said chamber.

This normal spaced relationship positions said members substantially in the center of the stroke, as known in the art, whereby they are relatively movable in response to a decrease in the relative spacing between the vehicle body and axle to a decreased telescoped relationship as is shown in Fig. 2. Conversely, said members are relatively movable in response to an increase in said relative spacing between the vehicle members to an extended position as is shown in Fig. 3. In the present instance the force exerted by each spring 71 and 81, is substantially equal, but it is contemplated that any desired combination of said springs may be utilized to provide a different resultant spring reaction whereby said movable members will be normally positioned in a different relative relationship and relatively movable in still a different manner.

As above described, the arm 69 of the spring housing 63 is adapted to be connected to either of the vehicle members, the body or the axles. In like manner, the piston rod 27 is threaded on its outer end 82 and mounts a pair of frictionless coupling elements 83 which are adapted to engage opposite sides of a portion of the other of said vehicle members. Assuming that the piston rod is connected to the vehicle body portion 84, as shown in Fig. 2, and the arm 69 is connected to the axles (not shown), then as the vehicle travels over an irregular roadway the rapid slight impacts resulting therefrom are transmitted to the spring housing 63, whereby the combined reaction of the springs 71 and 81 oppose said impacts and render the same ineffective to cause relative movement between the shock absorber members.

When the impacts or forces applied to the vehicle members are of a predetermined functioning period which cause the vehicle members to move relative to each other the resistance offered by the springs 71 and 81 is overcome. The spring housing then moves relative to the piston rod 27, working cylinder 10 and casing 11 and compresses one of the springs 71 or 81 depending upon the direction of relative movement between the vehicle members to provide a differential in force between said springs. With the impact to the vehicle members being sustained, this differential force overcomes the resistance exerted by the fluid medium and causes a relative movement between the piston rod 27 and the cylinder 10 and casing 11. This latter relative movement is effective to either raise the carrier plate 52 or open the recoil valve 58, depending upon whether the piston 37 is moving downwardly in the pressure cylinder in its impact stroke or upwardly therein in its recoil stroke. Said fluid medium is thereby allowed to flow to the opposite side of the piston to gradually diminish the resistance offered thereby to its movement. In this manner, as is well known in the art, the hydraulic phenomenon is effective to present an initial maximum opposition to the impact or force applied to the vehicle members which, as the impact or force is continued, is gradually diminished to effect the complete damping or partial absorption thereof. Also, when the piston is moving in the impact stroke or downwardly through the pressure cylinder, the fluid medium displaced from the pressure chamber is forced into the reservoir 12 whereby the air in said reservoir above the level of said fluid medium is compressed and provides a pneumatic pressure which near the end of the impact stroke of the piston 36 is of such magnitude as to prevent "bottoming" of the vehicle members as is well known in the art.

In accordance with the present invention, the control device includes valve means for controlling an air spring of a fluid suspension system which resiliently supports the vehicle body above the riding axles wherein the relative movement between the piston rod 27 and the cylinder 10 and casing 11 is effective to selectively actuate the valve means to inflate and/or deflate said air spring in response to a relative movement between said vehicle members. Also, the resistance offered by the fluid medium to the movement of the piston rod 27 and attached piston 37 provides a delay period between the initial application of the impact or force to the vehicle members and the actuation of the valve means for the air spring.

More specifically, the valve means includes the elongated tubular valve housing 17 formed internally with an upper exhaust chamber 86 and a lower inlet chamber 87, each being separated from the other by an annular inwardly extending wall 88 placed substantially intermediate the longitudinal axis of the housing and provided with a centrally located cylindrical passage 89. As previously mentioned the lower end of the valve housing is threadably mounted in the upper end of the casing 11 whereas, a cap member 31 is threadably secured to the upper end of the housing. The piston rod 27 extends upwardly into the valve housing and protrudes through the cylindrical passage 89 being spaced radially inwardly of the wall thereof to provide a substantially annular opening 92 therebetween, the purpose of which will be presently explained. Said piston rod extends upwardly through the cap member 31 and the aforesaid described frictionless couplings 83 are threadably mounted on to upper end 82 for connecting said piston rod to one of the vehicle members.

A port 94 is provided in the upper portion of the housing 17 which connects the exhaust chamber 86 to the atmosphere. Similarly, a port 95 is provided in the lower portion of said housing and communicates with the lower inlet chamber 87. Said port 95 is adapted to receive one end of flexible tubing 96, the other end of which is connected to a source of pressure fluid, preferably air, (not shown). In like manner, an internally threaded port 97 is found in the medial portion of the housing 17 and connects with the opening 92 of cylindrical passage 89. Said port 97 is adapted to receive one end of flexible tubing 98, the other end of which is connected to the air spring (not shown).

A raised annular valve seat 99 is provided on the top of the wall 88 surrounding the cylindrical passage 89 upon which an exhaust disk valve 101 disposed in the exhaust chamber 86 is arranged to be seated. Said disk valve 101 is slidably mounted over the piston rod 27 and carries a flexible valve seat engaging portion 102 such as soft rubber, which is adapted to firmly engage said raised valve seat 99 to shut off the upper end of the passage 89. A pair of helical springs 103 surrounds said piston rod 27 and having opposite ends pressing against the disk valve 101 and a pressure plate 102a whereby said disk valve is normally seated upon the valve seat 99. An annular valve seat 104 is also provided on the underside of the wall 88 and surrounds the cylindrical passage 89, and is arranged to seat a pressure inlet disk valve 105, similar in configuration to disk valve 101, and which is disposed in the inlet chamber 87 and slidably mounted over the piston rod 27. A soft rubber-like portion 106 of said disk valve 105 is adapted to be firmly seated upon said valve seat 104 to close the lower end of the cylindrical passage 89, by helical springs 107 surrounding the piston rod 27 with the opposite ends thereof pressing against said disk valve 105 and a spring retainer plate 108. A suitable valve O-ring 109 carried by each of said disk valves and engaging the surface of the piston rod 27 prevents the entrainment of pressure fluid therebetween.

As previously mentioned, the relative movement between the piston rod 27 and the working cylinder 10 is operative to selectively actuate the disk valves 101 and 105, to connect the air spring to the exhaust chamber 86 to deflate said spring, or to the inlet chamber 87 to inflate said spring, said selective actuation being responsive to an increase or decrease, respectively, in the relative spacing between the vehicle members.

To accomplish this, a pair of annular collars, 111, are securely mounted on the piston rod 27 in-between said disk valves and are longitudinally spaced along said piston rod a distance less than the length of the cylindrical passage 89. As shown in Fig. 1, the piston rod 27 is positioned in the valve housing 17 so that the collars 111 are disposed within the cylindrical passage 89 and are spaced inwardly of the top and bottom surfaces thereof.

It will now be realized that when the piston rod 27 is stroked sufficiently to carry one of the attached collars 111 out of the confines of the cylindrical passage 89, said collar will engage the disk valve closing the adjacent end of said passage whereby the air spring is connected through the port 97 and the opening 92 to either the exhaust chamber 86 or the inlet chamber 87 depending upon the movement of said piston rod. The elapsed time between the initial movement of the piston rod 27 and the actuation of either of the disk valves 101 and 105 which is due to the above described hydraulic damping mechanism constitutes a delay period which is structurally indicated in Fig. 1 of the drawings as being the spacing 113 between each of the collars 111 and its associated valve when the piston rod 27 is in its normal inactive position. This delay period may be such that one of the valves may be actuated by a movement of said piston rod 27 of less magnitude in one direction than in the opposite direction. Also, merely one collar may be utilized instead of the pair as is shown and mounted on the piston rod to give equal or unequal delay periods in either direction of movement of the piston rod.

In operation, the control device of the present invention is usually mounted between the vehicle body and its riding axles, and in the instant form it will be assumed that the piston rod 27 is connected through the frictionless couplings 83 to the vehicle body and the spring housing 63 is connected by means of the attached arm 69 to the riding axles. The air spring (not shown) of the fluid suspension system resiliently supports the vehicle body above the riding axles and is connected to the cylindrical passage 89 of the valve housing 17 through the aforesaid flexible tubing 98. A suitable source of fluid pressure (not shown), such as an air compressor and reservoir tank carried by the vehicle and actuated by the vehicle motor, is connected to the inlet chamber 87 by the flexible tubing 96.

Upon normal riding conditions, the relatively movable elements of the control device are positioned as shown in Fig. 1 wherein the spring housing 63 is in the approximate center or neutral position of its stroke and the piston rod 27 and attached piston 37 are positioned in the working cylinder 10 so that the disk valve actuating collars 111 are disposed within the cylindrical passage 89. Under these conditions the air spring is resiliently supporting the vehicle body above the riding axles in what is defined as the "safe-riding" spaced relationship.

When the vehicle travels over an irregular roadway, the slight impacts received therefrom are applied to the axles and thence to the spring housing 63 connected thereto whereby the combined action of springs 71 and 81 are effective to oppose said slight impacts and render the same ineffective to produce relative movement between the components of the control device.

The resistance exerted by the springs 71 and 81 is overcome and the spring housing 63 is then forced upward into the skirt 72 compressing spring 81 and allowing spring 71 to expand and providing a differential force between said springs. With the relative movement between the vehicle members being sustained, said differential force overcomes the resistance of the fluid medium and causes a relative movement between the piston rod 27 and the cylinder 10 and casing 11. This latter movement is sufficient to cause the piston rod and attached piston to be stroked downward in the cylinder 10 and raises the carrier plate 52 whereby the resistance of the fluid medium is gradually overcome and the piston rod and said piston then move downward in the pressure cylinder. After a predetermined delay period, said movement is sufficient to carry the lower collar 111 into engagement with the disk valve 105 to unseat said valve, whereby pressure fluid, in the present instance being air, flows through port 95, into the opening 92 and through connected port 97 and flexible tubing 98 to inflate the air spring.

As the air spring is being inflated it causes the vehicle body to be raised upwardly until said vehicle members are once again in the "safe-riding" spaced relationship. As the vehicle body is being raised, the differential force between the springs 71 and 81 is effective to re-set the members of the control device in the position shown in Fig. 1, and when said "safe-riding" spaced relationship is once more established between the vehicle members the collars 111 have been returned to within the cylindrical passage 89 whereby the disk valve 105 seats upon its valve seat 104 shutting off the air spring from the pressure fluid source.

In Fig. 2 the piston rod 27 and attached piston 36 are shown at the bottom of the pressure cylinder 10 in a fully collapsed position, or at the end of the impact stroke, as is defined in the art. This position may be realized when the load on the vehicle is substantially increased and the resistance of the fluid medium in said cylinder has been completely overcome. However, it is understood that lighter loads may force the piston rod and attached piston to a plurality of positions relative to the pressure cylinder and casing whereby the air spring will be adjusted. It is also realized that the sensitivity of the removable shock absorber components of the control device to changes in the relative movement between the vehicle members to cause adjustment of said air spring, may be regulated by changing the position of said disk valve actuating collars 111, the viscosity of the fluid medium in the pressure cylinder and other mechanical improvements thereto as is known in the art without departing from the concepts disclosed herein.

Similarly, when the mass of the vehicle body is decreased, as by lessening the load carried thereby, the vehicle body is raised upwardly by the air spring. This relative movement between the vehicle members causes the housing 63 to move outwardly of the skirt 72 compressing spring 71 and allowing spring 81 to expand and providing a differential force therebetween. With the relative movement between the vehicle members continuing, the differential force between said springs overcomes the resistance of the fluid medium and causes a relative movement between the piston rod 27 and attached piston 37, cylinder 10 and casing 11. This latter movement is sufficient to cause the piston rod and piston to be stroked upwardly in the cylinder 10 and open the recoil valve 58 to gradually diminish the resistance of said fluid medium. After said delay period has transpired the piston rod is moved sufficiently to cause the upper collar 111 to actuate exhaust disk valve 101. Said valve is carried off its seat 99 and the air spring is connected through the port 97 and the opening 92 to the exhaust chamber 86 and associated exhaust port 94 whereby said air spring is deflated. The vehicle body is then lowered toward the axles to their "safe-riding" spaced relationship whereby the springs 71 and 81 are operative to reset the members of the control device in their neutral position as shown in Fig. 1.

In view of the above detailed description and operational disclosure it is now realized that the control device of the present invention is operative to resist relative movement between the vehicle members as results from the vehicle traveling over an irregular roadway to prevent adjustment of the air spring. It is also realized that the control device is operative to resiliently resist the relative movement between the vehicle members as results from impacts or forces applied thereto that are below a predetermined functioning period. And further, it is also realized that the control device of the present invention is operative to cause adjustment of an air spring, of a fluid suspension system which resiliently supports a vehicle body above its axles in response to a relative movement between the vehicle members that is of a prolonged duration.

Having thus described my invention in detail, it is understood that the same is susceptible of various modifications and combinations within the scope of the appended claims.

Having thus described our invention, we claim:

1. A control valve device for an air spring interposed between two relatively movable members, said device comprising a casing having a sealed fluid containing pressure cylinder and a separate valve chamber, a piston rod rigidly connected to one of said members and extending through said valve chamber and into said pressure cylinder and provided therein with a piston, means for placing said valve chamber in communication with said air spring, means for placing said valve chamber in communication with a source of supply of pressure fluid, means for placing said valve chamber in communication with atmosphere, separate normally seated valve means in said chamber for controlling said last two named means, means on said piston rod for unseating one or the other of said valve means upon movement of said piston rod in opposite directions relative to said casing, attaching means surrounding said casing connected to the other of said relatively movable members, a skirt member surrounding said attaching means spaced radially outwardly thereof and operatively connected to said casing, first resilient means having ends engaging respectively the casing and said attaching means, second resilient means having ends engaging respectively the attaching means and said skirt member, said first and second resilient means acting upon relative movement between said movable members first to allow relative movement between said attaching means and the casing without overcoming the resistance of the cylinder fluid to cause a delay in the unseating of one or the other of said valve means, and then after said relative movement between the movable members has been maintained for a preselected time to overcome said resistance to cause relative movement between said casing and said piston rod to unseat one of the other of said valve means.

2. A control valve device for an air spring interposed between two relatively movable members, said device comprising a casing having a sealed fluid containing pressure cylinder and a separate valve housing, a piston rod rigidly connected to one of said movable members and extending through said valve housing and into said pressure cylinder and provided therein with a piston, an exhaust and an inlet chamber in said housing and a port provided in the latter interconnecting said chambers, a valve seat formed on each end of said port, separate valve means normally seated on each of said valve seats effective to seal said port from said chambers, means for placing said port in communication with said air spring, means for placing said exhaust chamber in communication with atmosphere, means for placing said inlet chamber in communication with a source of supply of pressure fluid, means on said piston rod movable therewith for unseating one or the other of said valve means upon movement of said rod in opposite directions relative to said casing to connect said port to one or the other of said chambers, attaching means surrounding said casing connected to the other of said relatively movable members, and resilient means having ends engaging respectively said attaching means and said casing and acting upon relative movement between said members in opposite directions, first to allow relative movement between said attaching means and the casing without overcoming the resistance of the cylinder fluid to cause a delay in the unseating of one or the other of said valve means and then after said relative movement between the movable members has been maintained for a preselected time to overcome said resistance to effect relative movement between said casing and piston rod to unseat one or the other of said valve means.

3. A control valve device for an air spring positioned between two relatively movable members, said device comprising a casing having a sealed fluid containing pressure cylinder, a piston rod to be connected to one of said members to extend into the cylinder such that the casing and rod are relatively movable, a piston within said pressure cylinder connected to the rod, control means carried by said casing and said rod operable in response to relative movement between said rod and casing in one direction to permit inflation of said air spring, and operable in response to relative movement between said rod and casing in the opposite direction to permit deflation of said air spring, attaching means surrounding said casing to be connected to the other of said members for movement relative to said casing and rod, and resilient means having ends engaging respectively said attaching means and said casing effective upon relative movement between said members to initially permit relative movement between said attaching means and said casing without overcoming the resistance of the cylinder fluid and then after said relative movement between the members has been maintained for a preselected time to overcome said resistance to cause relative movement between the casing and rod to operate said control means.

4. A control valve device for an air spring positioned between two relatively movable members, said device comprising a casing means having a sealed fluid containing pressure cylinder, a piston rod to be connected to one of said members to extend into the cylinder such that the casing means and rod are relatively movable, a piston within said pressure cylinder connected to the rod, control means carried by said casing means and said rod operable in response to relative movement between said rod and casing means in one direction to permit inflation of said air spring, and operable in response to relative movement between said rod and casing means in the opposite direction to permit deflation of said air spring, attaching means surrounding said casing means to be connected to the other of said members for movement relative to said casing means and rod, and resilient means positioned between said attaching means and said casing means effective upon relative movement between said members to initially permit relative movement between said attaching means and said casing means, and to subsequently cause relative movement between said casing means and said rod to operate said control means, said resilient means comprising a pair of spaced coil springs each having ends engaging respectively said attaching means and said casing means, said springs being arranged such that one of the springs is compressed and the other spring is expanded in response to movement of said members toward each other, and said one spring is expanded and said other spring is compressed in response to movement of said members away from each other.

5. A control valve device for an air spring positioned between two relatively movable members, said device comprising a casing having a sealed fluid containing pressure cylinder, a piston rod to be connected to one of said members to extend into the cylinder such that the casing and rod are relatively movable, a piston within said pressure cylinder connected to the rod, control means carried by said casing and said rod operable in response to relative movement between said rod and casing in one direction to permit inflation of said air spring, and operable in response to relative movement between said rod and casing in the opposite direction to permit deflation of said air spring, attaching means surrounding said casing to be connected to the other of said members for movement relative to said casing and rod, a skirt member carried by said casing to surround said attaching means, and resilient means engaging said attaching means, said casing and said skirt member effective upon relative movement between said members to initially permit relative movement between said attaching means and said casing without overcoming the resistance of the cylinder fluid and then after said relative movement between the member has been maintained for a preselected time to overcome said resistance to cause relative movement between said casing and rod to operate said control means.

6. A control valve device for an air spring positioned between two relatively movable members, said device comprising a casing having a sealed fluid containing pressure cylinder, a piston rod to be connected to one of said members to extend into the cylinder such that the casing and rod are relatively movable, a piston within said pressure cylinder connected to the rod, control means carried by said casing and said rod operable in response to relative movement between said rod and casing in one direction to permit inflation of said air spring, and operable in response to relative movement between said rod and casing in the opposite direction to permit deflation of said air spring, attaching means surrounding said casing in radially spaced relation with the casing to be connected to the other of said members for movement relative to said casing and rod, a skirt member carried by said casing to surround said attaching means in radially spaced relation with the attaching means, and resilient means positioned between said attaching means, said casing and said skirt member, said resilient means being effective upon relative movement between said members to initially permit relative movement between said attaching means and said casing, and to subsequently cause relative movement between said casing and rod to operate said control means, said resilient means including a first coil spring positioned in the space between the attaching means and said skirt member with its ends engaging axially spaced points of said attaching means and said skirt member, and a second coil spring positioned in the space between said casing and said attaching means with its ends engaging axially spaced points of said casing and said attaching means.

7. A control valve device for an air spring positioned between two spaced relatively movable members, said device comprising a casing having a sealed fluid containing pressure cylinder and a valve housing in axially spaced relation with the cylinder, a piston rod to be connected to one of said members to extend through said housing into said cylinder such that the housing and rod are relatively movable, a piston within said pressure cylinder connected to the rod, control means carried by said housing and said rod operable in response to relative movement between said housing and rod in one direction to permit inflation of said air spring, and operable in response to relative movement between said housing and rod in the opposite direction to permit deflation of said air spring, a tubular attaching element positioned to surround said casing in radially spaced relation therewith, said attaching element having an open end through which said casing extends permitting relative axial movement between the casing and attaching element, and having a substantially closed end to be connected to the other of said members, a tubular skirt element positioned to surround said attaching element in radially spaced relation therewith, said skirt element being mounted for movement with said casing such that the attaching and skirt elements are axially movable relative to each other, a first coil spring positioned in the space between said casing and said attaching element with its ends engaging axially spaced points of said casing and attaching element, and a second coil spring positioned in the space between said attaching and skirt elements with its ends engaging axially spaced points of said attaching and skirt elements, said springs operating in response to variation of the spacing between said two members to initially permit relative movement between the casing and attaching element without relative movement between the casing and rod, and operating subsequently in response to maintenance of said variation in spacing for a preselected time to effect relative movement between said casing and said rod to operate said control means.

References Cited in the file of this patent
UNITED STATES PATENTS

| | | |
|---|---|---|
| 1,664,510 | Hughes | Apr. 3, 1928 |
| 2,189,221 | Paine et al. | Feb. 6, 1940 |
| 2,260,634 | Mullner | Oct. 28, 1941 |
| 2,372,311 | Brown | Mar. 27, 1945 |